United States Patent
Godbole et al.

(10) Patent No.: US 8,519,640 B1
(45) Date of Patent: *Aug. 27, 2013

(54) SYSTEM AND METHOD FOR CONTROLLING A LIGHT EMITTING DIODE FIXTURE

(75) Inventors: Kedar Godbole, San Jose, CA (US); Doug Vargha, Palo Alto, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 12/505,412

(22) Filed: Jul. 17, 2009

Related U.S. Application Data

(63) Continuation of application No. 12/341,786, filed on Dec. 22, 2008, now Pat. No. 8,154,221.

(60) Provisional application No. 61/015,835, filed on Dec. 21, 2007.

(51) Int. Cl.
*H05B 37/02* (2006.01)

(52) U.S. Cl.
USPC .......................... 315/307; 315/247; 315/294

(58) Field of Classification Search
USPC ............ 315/149–159, 209 R, 219, 224, 247, 315/291, 294, 297, 307–308
See application file for complete search history.

(56) References Cited

U.S. PATENT DOCUMENTS

| | | | |
|---|---|---|---|
| 5,323,088 A | 6/1994 | Cunningham | |
| 5,430,356 A * | 7/1995 | Ference et al. | 315/291 |
| 5,530,322 A * | 6/1996 | Ference et al. | 315/295 |
| 5,783,909 A * | 7/1998 | Hochstein | 315/159 |
| 6,150,771 A * | 11/2000 | Perry | 315/291 |
| 6,225,759 B1 | 5/2001 | Bogdan et al. | |
| 6,229,271 B1 * | 5/2001 | Liu | 315/291 |
| 6,798,152 B2 * | 9/2004 | Rooke et al. | 315/209 R |
| 6,828,740 B2 * | 12/2004 | Takahashi et al. | 315/291 |
| 7,304,439 B2 * | 12/2007 | Tang et al. | 315/291 |
| 7,482,758 B2 * | 1/2009 | Hua et al. | 315/119 |
| 7,667,408 B2 * | 2/2010 | Melanson et al. | 315/209 R |
| 7,852,017 B1 * | 12/2010 | Melanson | 315/291 |
| 7,888,886 B2 * | 2/2011 | Wu | 315/307 |
| 7,978,485 B2 | 7/2011 | Stamm et al. | |
| 2004/0085030 A1 * | 5/2004 | Laflamme et al. | 315/291 |
| 2004/0135523 A1 * | 7/2004 | Takahashi et al. | 315/291 |
| 2005/0275354 A1 | 12/2005 | Hausman et al. | |
| 2007/0182338 A1 | 8/2007 | Shteynberg et al. | |
| 2007/0182347 A1 | 8/2007 | Shteynberg et al. | |
| 2008/0030148 A1 | 2/2008 | Tang et al. | |
| 2008/0258647 A1 * | 10/2008 | Scianna | 315/291 |
| 2009/0122580 A1 * | 5/2009 | Stamm et al. | 363/44 |

OTHER PUBLICATIONS

U.S. Appl. No. 12/341,786: "Controlling a Light Emitting Diode Fixture," Godbole et al., filed Dec. 22, 2008; 27 pages.

(Continued)

*Primary Examiner* — Tung X Le

(57) ABSTRACT

One embodiment in accordance with the invention can include a circuit for controlling a light emitting diode (LED) lighting fixture via a power line. The circuit can include a power switch coupled to the power line and is for outputting a firing angle. Additionally, the circuit can include a control circuit coupled to the power switch and is for implementing firing angle control of the power switch. Furthermore, the circuit can include a translator coupled to receive the firing angle and for mapping the firing angle to a function of the LED lighting fixture.

16 Claims, 6 Drawing Sheets

(56) References Cited

OTHER PUBLICATIONS

International Search Report of the International Searching Authority for International Application No. PCT/US08/13976 dated Mar. 19, 2009; 2 pages.

The Written Opinion of the International Searching Authority for International Application No. PCT/US08/13976 dated Mar. 19, 2009; 4 pages.

International Search Report and Written Opinion for International Application No. PCT/US08/13976 dated Mar. 19, 2009; 3 pages.

USPTO Advisory Action for U.S. Appl. No. 12/341,786 dated Nov. 17, 2011; 3 pages.

USPTO Final Rejection for U.S. Appl. No. 12/341,786 dated Aug. 11, 2011; 7 pages.

USPTO Non Final Rejection for U.S. Appl. No. 13/854,699 dated Jun. 4, 2013; 11 pages.

USPTO Non-Final Rejection for U.S. Appl. No. 12/341,786 dated Feb. 23, 2011; 11 pages.

USPTO Notice of Allowance for U.S. Appl. No. 12/341,786 dated Dec. 12, 2011; 8 pages.

USPTO Notice of Allowance for U.S. Appl. No. 12/341,786 dated Feb. 22, 2012; 5 pages.

\* cited by examiner

SYSTEM AND METHOD FOR CONTROLLING A LIGHT EMITTING DIODE FIXTURE

CROSS-REFERENCE TO RELATED APPLICATIONS

The present application is a continuation of U.S. application Ser. No. 12/341,786, filed Dec. 22, 2008, which claims the benefit of US. Provisional Application No, 61/015,835, filed Dec. 21, 2007, the entire contents of each of which are hereby incorporated by reference herein.

BACKGROUND

There are different types of lighting technologies that can be utilized for illuminating indoor or outdoor space. For example, these different lighting technologies can include incandescent light bulb technology, fluorescent tube (or fluorescent lamp) technology, halogen light bulb technology, compact fluorescent lamp (CFL) technology, and light emitting diode (LED) lighting fixture technology. With regard to LED lighting fixture technology, it is pointed out that there are different techniques which can be utilized to provide a dimming functionality to one or more LED lighting fixtures. However, these techniques are expensive.

SUMMARY

One embodiment in accordance with the invention can include a circuit for controlling a light emitting diode (LED) lighting fixture via a power line. The circuit can include a power switch coupled to the power line and is for outputting a firing angle. Additionally, the circuit can include a control circuit coupled to the power switch and is for implementing firing angle control of the power switch. Furthermore, the circuit can include a translator coupled to receive the firing angle and for mapping the firing angle to a function of the LED lighting fixture.

DETAILED DESCRIPTION

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications and equivalents, which may be included within the scope of the invention as construed according to the Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Figure 1:
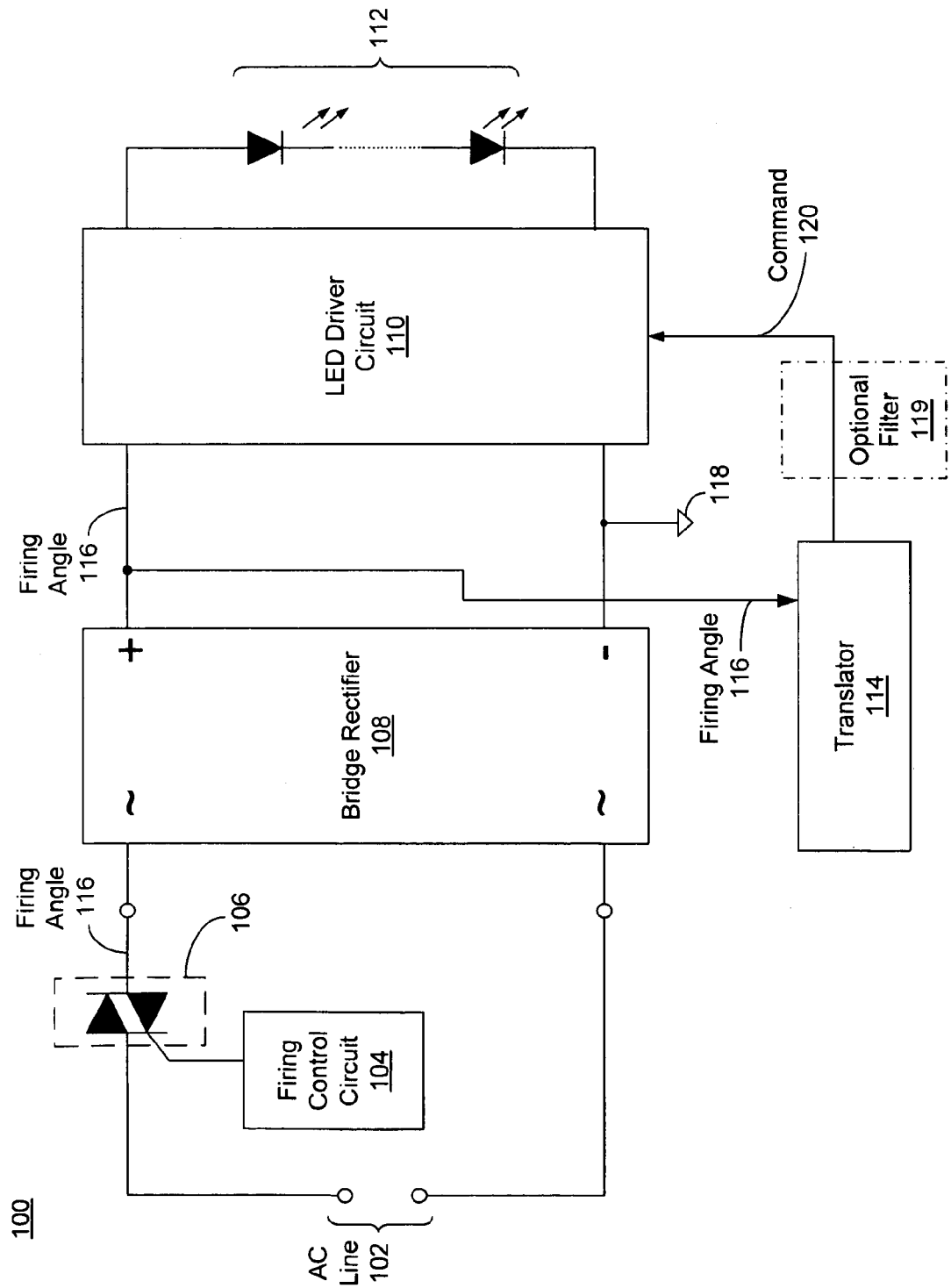
FIG. 1 is a schematic diagram of an exemplary light emitting diode (LED) control circuit in accordance with various embodiments of the invention.

FIG. 1 is a schematic diagram of an exemplary light emitting diode (LED) control circuit 100 in accordance with various embodiments of the invention. In one embodiment, the LED control circuit 100 can implement analog dimming with power line dimmers for a LED lighting fixture 112. As such, the LED control circuit 100 can transmit the dimming value from a dimmer to the LED lamp 112 by modifying the control signal to a Triac Dimmer 106, and utilizing a translator circuit 114. Therefore, the LED control circuit 100 can provide an ultra-low cost dimming implementation for LED fixtures 112. Furthermore, the LED control circuit 100 can allow the LED lamps or fixtures 112 to be retrofit into existing wiring of a home or office space.

Specifically, in an embodiment, the LED control circuit 100 includes an interpreted firing angle dimming scheme for controlling the firing angle (or turn on angle) of a thyristor or other power switch 106 to control the brightness or other features of the output of the LED lamp 112. Within the LED control circuit 100, a firing control circuit 104 is able to control the power switch 106 (e.g., triac or thyristor) such that the power switch outputs a firing angle (or turn on angle) 116. The firing control circuit 104 can be implemented in a wide variety of ways. For example in one embodiment, the firing control circuit 104 can be implemented as a potentiometer, but is not limited to such. In one embodiment, the firing angle 116 can be varied for a small fraction (e.g., less than or equal to 45 degrees) of the half cycle of the power line 102. For example in an embodiment, the firing angle 116 may be implemented as less than or equal to 20 degrees of a sine wave (e.g., 202 of FIG. 2) or cosine wave received via the power line 102, but is not limited to such. In one embodiment, the firing angle 116 may be implemented as less than a substantial fraction (e.g., 90 degrees or more) of a sine wave (e.g., 202 of FIG. 2) or cosine wave received via the power line 102, but is not limited to such. It is noted that the firing angle 116 output by the power switch 106 can be received by a bridge rectifier circuit 108, a translator circuit 114, and an LED driver circuit 110. It is pointed out that the translator circuit 114 can translate or map the received firing angle 116 into a function or command 120 that is associated with controlling the one or more LEDs 112 via the LED driver circuit 110. For example, the firing angle 116 may be scaled by an analog circuit of the translator circuit 114, or the firing angle 116 can be measured by timing the transition (edge) of the output of the dimmer 106 and is used as an intensity input with system dependent scaling or other translation. Furthermore, the firing angle 116 can be filtered to prevent noise or jitter from causing visible flicker within the LEDs 112. It will be appreciated that in various embodiments, the translator circuit 114 may be implemented as analog, digital or mixed signal implementation, or other implementation.

Within FIG. 1, the power 102 and the firing angle 116 to the LED fixture 112 can be varied by a small amount (e.g., 10-25 degrees) in one embodiment, such that the regulated current or voltage sources inside the LED fixture 112 can compensate for the variation. The present embodiment offers better dimming by reducing the change involved in the firing angle for feature control. As such, the power factor of the LED control circuit 100 has reduced distortion, at low intensity levels. In an embodiment, the brightness can now be made proportional to a different mapping function within the translator circuit 114, such as:

$$(1-\phi/\phi_{max})$$

where $\phi$ is equal to the firing angle output by the power switch 106. It is noted that the mapping function of the translator circuit 114 is not limited by the above shown mapping function.

It is noted that the power switch 106 can be implemented in a wide variety of ways. For example in one embodiment, the power switch 106 can be implemented with, but is not limited to, a triac or thyristor, which is a class of a semiconductor switch. The thyristor can have three terminals. It is pointed out that when the power switch 106 is implemented as a thyristor, the firing control circuit 104 can pulse one of its terminals, which causes the thyristor to turn on and stay on until the current through this thyristor goes to zero.

Within FIG. 1, in one embodiment, the translator circuit 114 can interpret the firing angle 116 so that the variations are small, but useful and keep the firing angle 116 in a small range so that the translator 114 can map the small variation to a precise changing of the brightness (for example) of the LED fixture 112. It is noted that the translator circuit 114 can receive the firing angle 116 as part of a sine wave (e.g., 202 of FIG. 2) or cosine wave of the power line 102. As such, the translator circuit 114 is able to determine the firing angle 116 from the received sine wave or cosine wave. Once the translator circuit 114 knows the firing angle 116, it can control substantially any property of the LED fixture 112. It is noted that the firing angle 116 can be implemented in a wide variety of ways. For example, a zero firing angle 116 can be interpreted (or mapped) by the translator circuit 114 as maximum brightness for the LED fixture 112. Furthermore, a 20 degree firing angle 116 can be interpreted by the translator circuit 114 as a zero brightness level for the LED fixture 112. It is noted that these specific firing angles are exemplary. Note that the firing angle is where the thyristor or power switch 106 is turned on.

In accordance with one embodiment, the firing angle 116 is treated as a piece of information by the translator circuit 114, which is able to translate or interpret it with relation to the functionality of the LED fixture 112. For example, the translator circuit 114 can include one or more mapping functions that can be utilized to determine the corresponding function and/or functions associated with each received firing angle 116. For example, one mapping function associated with a firing angle 116 can result in an increase of brightness in the LED fixture 112 while another mapping function associated with another firing angle 116 can result in a decrease of brightness in the LED fixture 112. Moreover, one or more mapping functions associated with one or more firing angles 116 can be used to set the color of the LED fixture 112. In addition, one or more mapping functions associated with one or more firing angles 116 can be used to increase or decrease the power dissipation of the LED fixture 112. Furthermore, one or more mapping functions associated with one or more firing angles 116 can be used to change the power factor of the LED fixture 112. In an embodiment of the LED control circuit 100, the translator circuit 114 can be implemented such that it can map any firing angle 116 with any functionality of the LED driver circuit 110 and/or the LED fixture 112.

Within FIG. 1, in one embodiment the LED control circuit 100 can be utilized for controlling the intensity of the LED lighting fixture 112 via the power line 102. It is pointed out that the power switch 106 can be coupled to the power line 102 and that the power switch 106 can be for outputting the firing angle 116. In addition, the firing control circuit 104 can be coupled to the power switch 106 and the firing control circuit 104 can be for implementing the firing angle control of the power switch 106. The LED control circuit 100 can also include a bridge rectifier circuit 108 that can be coupled to the power switch 106 and can be for receiving the firing angle 116. Moreover, the translator 114 can be coupled to receive the firing angle 116 from the bridge rectifier circuit 108 and the translator 114 can be for utilizing one or more mapping functions to map the received firing angle 116 to an intensity function of the LED lighting fixture 112. Furthermore, the LED driver circuit 110 can be coupled to the LED lighting fixture 112 and can be for receiving the firing angle 116 from the bridge rectifier 108. It is noted that the firing angle 116 can be implemented in a wide variety of ways. For example, the firing angle 116 can be, but is not limited to, less then or equal to 20 degrees of a sine wave (e.g., 202 of FIG. 2) or cosine wave of the power line 102. It is noted that an optional filter 119 can be coupled to receive a command 120 output from the translator 114. It is noted that the filter element 119 can filter the command 120 to prevent noise or jitter from causing visible flicker to the LED lighting fixture 112. Furthermore, the filter element 119 can be implemented in a wide variety of ways. For example, the filter element 119 can be, but is not limited to, an analog filter element, a digital filter element, or a mixed-signal filter element. In one embodiment, the mapping function can also be for mapping the firing angle 116 to, but is not limited to, a color function of the LED lighting fixture 112, a power factor function of the LED lighting fixture 112, and/or a power dissipation function (e.g., decrease or increase) of the LED lighting fixture 112.

In one embodiment, the firing angle 116 can be encoded to include one or more pieces of information. For example, the firing angle 116 can be encoded with, but is not limited to, brightness information, color information, a power factor, power dissipation information, and the like that would be associated with one or more properties of the LED fixture 112. For instance, a first pulse of the firing angle 116 can be for brightness, a second pulse can be for an X value for a color (X, Y) coordinate, and a third pulse can be for a Y value for the color (X, Y) coordinate. In an embodiment, the firing angle 116 can be divided into ranges, which can each have a different meaning associated with them. For example in one embodiment, the firing angle 116 can have three ranges from 0 to 60 degrees. Specifically, when the firing control circuit 104 causes the power switch 106 to transmit a firing angle 116 within the range of zero to 20 degrees, this can correspond to the color red being output by the LED fixture 112. Furthermore, when the firing control circuit 104 causes the power switch 106 to transmit a firing angle 116 within the range of 21 to 40 degrees, this can correspond to the color green being output by the LED fixture 112. In addition, when the firing control circuit 104 causes the power switch 106 to transmit a firing angle 116 within the range of 41 to 60 degrees, this can correspond to the color blue being output by the LED fixture 112. It is pointed out that the LED control circuit 100 can cause the LED fixture 112 to output different colors in a wide variety of ways.

Within FIG. 1, in accordance with one embodiment, it is pointed out that the firing control circuit 104 can control the power switch 106 in such a manner that the harmonic factor or power factor can be changed of the LED fixture 112. For example in an embodiment, the domain of the sine wave (e.g., 202 of FIG. 2) or cosine wave received via the power line 102 can be restricted to a specific range. For instance, if the domain was restricted to a range of zero to 20 degrees, the result would be that one ninth of the 180 degrees of the sine wave (or cosine wave) are actually being used. As such, the distortion will inherently be small and that enhances the power factor of the LED fixture 112.

It is pointed out that the firing control circuit 104 can change (e.g., minimize or maximize) the power dissipation in the LED fixture 112, in accordance with an embodiment of the invention. Furthermore, together with the harmonic content, the electromagnetic interference (EMI) signature can also be cleaned up of the LED control circuit 100. Note that by limiting the EMI signals of the LED control circuit 100, interaction is prevented between multiple controllers that may be included as part of the LED lighting fixture 112. It is noted that the LED lighting fixture 112 can be implemented in a wide variety of ways. For example, the LED lighting fixture 112 can include, but is not limited to, one or more LEDs coupled in series, in parallel, or any combination thereof.

Within FIG. 1, the light emitting diode (LED) control circuit 100 can include, but is not limited to, an AC power source 102, a power switch 106, a firing control circuit 104, a bridge rectifier 108, a LED driver circuit 110, LED fixture 112, a translator circuit 114, and an optional filter 119. The power line 102 (e.g., live or high end) can be coupled to an input terminal of the power switch 106. The firing control circuit 104 can be coupled to a control terminal of the power switch 106. An output terminal of the power switch 106 can be coupled to a first terminal of the bridge rectifier 108. A second terminal (e.g., positive terminal) of the bridge rectifier 108 can be coupled to a first terminal of the LED driver circuit 110 and to an input terminal of the translator circuit 114. Additionally, a third terminal (e.g., negative terminal) of the bridge rectifier 108 can be coupled to ground 118 and to a second terminal of the LED driver circuit 110. An output terminal of the LED driver circuit 110 can be coupled to an anode (or input) of the LED fixture 112. Furthermore, a cathode (or output) of the LED fixture 112 can be coupled to a third terminal of the LED driver circuit 110. An output terminal of the translator circuit 114 can be coupled to a fourth terminal of the LED driver circuit 110. It is noted that a fourth terminal of the bridge rectifier circuit 108 can be coupled to the power line 102 (e.g., neutral or ground). In an embodiment, the output terminal of the translator circuit 114 can be coupled to an input terminal of the optional filter element 119, while the output terminal of the filter element 119 can be coupled to the fourth terminal of the LED driver circuit 110.

It is noted that the LED control circuit 100 may not include all of the elements illustrated by FIG. 1. Additionally, the LED control circuit 100 can be implemented to include one or more elements not illustrated by FIG. 1. It is pointed out that the LED control circuit 100 can be utilized in any manner similar to that described herein, but is not limited to such.

Figure 2:
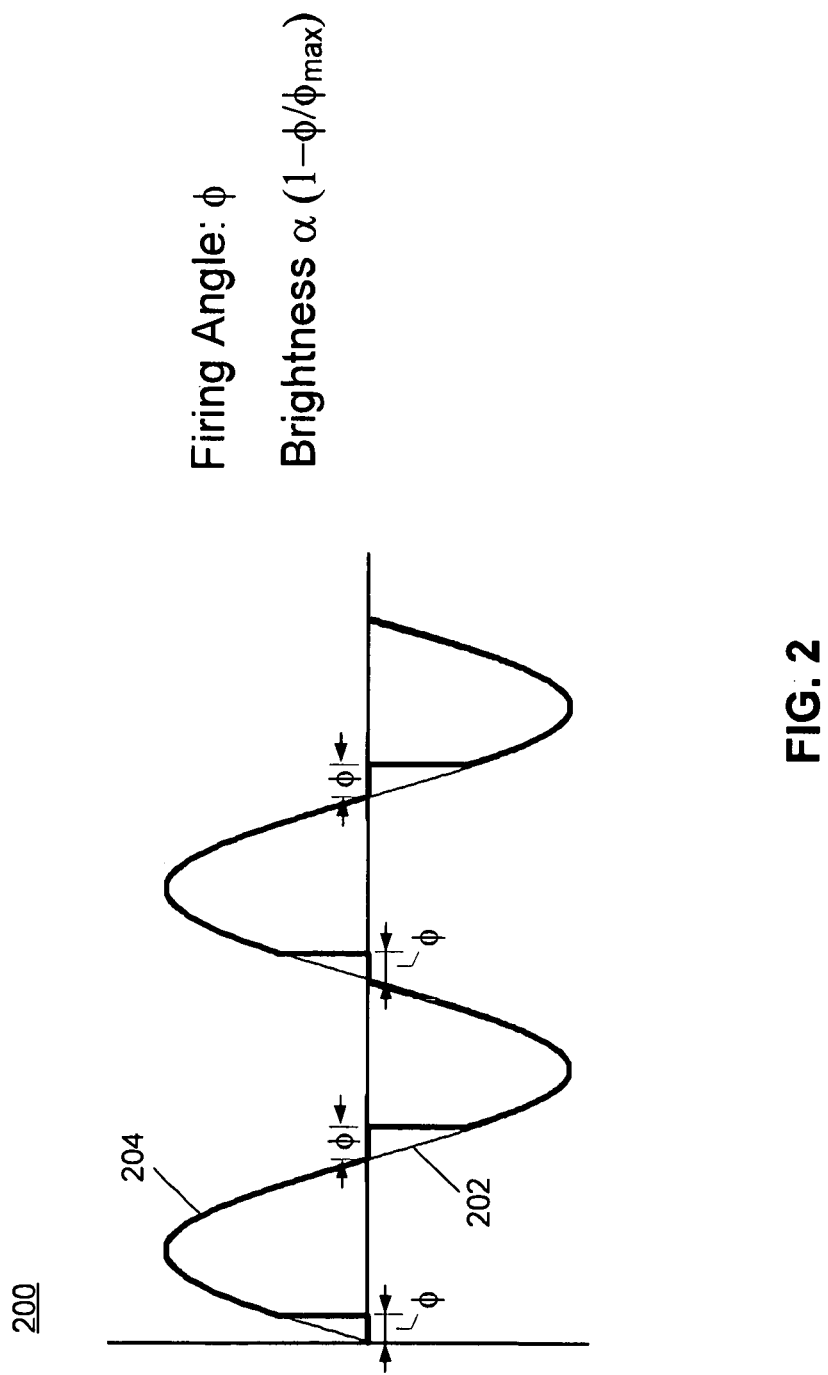
FIG. 2 is an exemplary graph illustrating a firing angle in accordance with various embodiments of the invention.

FIG. 2 is an exemplary graph 200 illustrating a firing angle in accordance with various embodiments of the invention. Specifically, graph 200 includes a sine waveform 202 along with a waveform 204 (indicated by the bold waveform). It is pointed out that in one embodiment, the sine waveform 202 can be received by the LED control circuit 100 from the power line 102 (FIG. 1). Furthermore, the waveform 204 can be produced by the power switch 106 under the control of the firing control circuit 104. As shown in FIG. 2, the firing angles shown within graph 200 are represented by the Greek letter phi (φ), which can be implemented and generated in any manner similar to that described herein, but is not limited to such. FIG. 2 further indicates that the brightness associated with the waveform 204 can be approximated in accordance to:

$$(1-\phi/\phi_{max})$$

where φ is equal to the firing angle output by the power switch 106, but is not limited to such. In one embodiment, the firing angle can be implemented in relation to a cosine waveform, wherein the cosine waveform can be received by the LED control circuit 100 from the power line 102 (FIG. 1).

Figure 3:
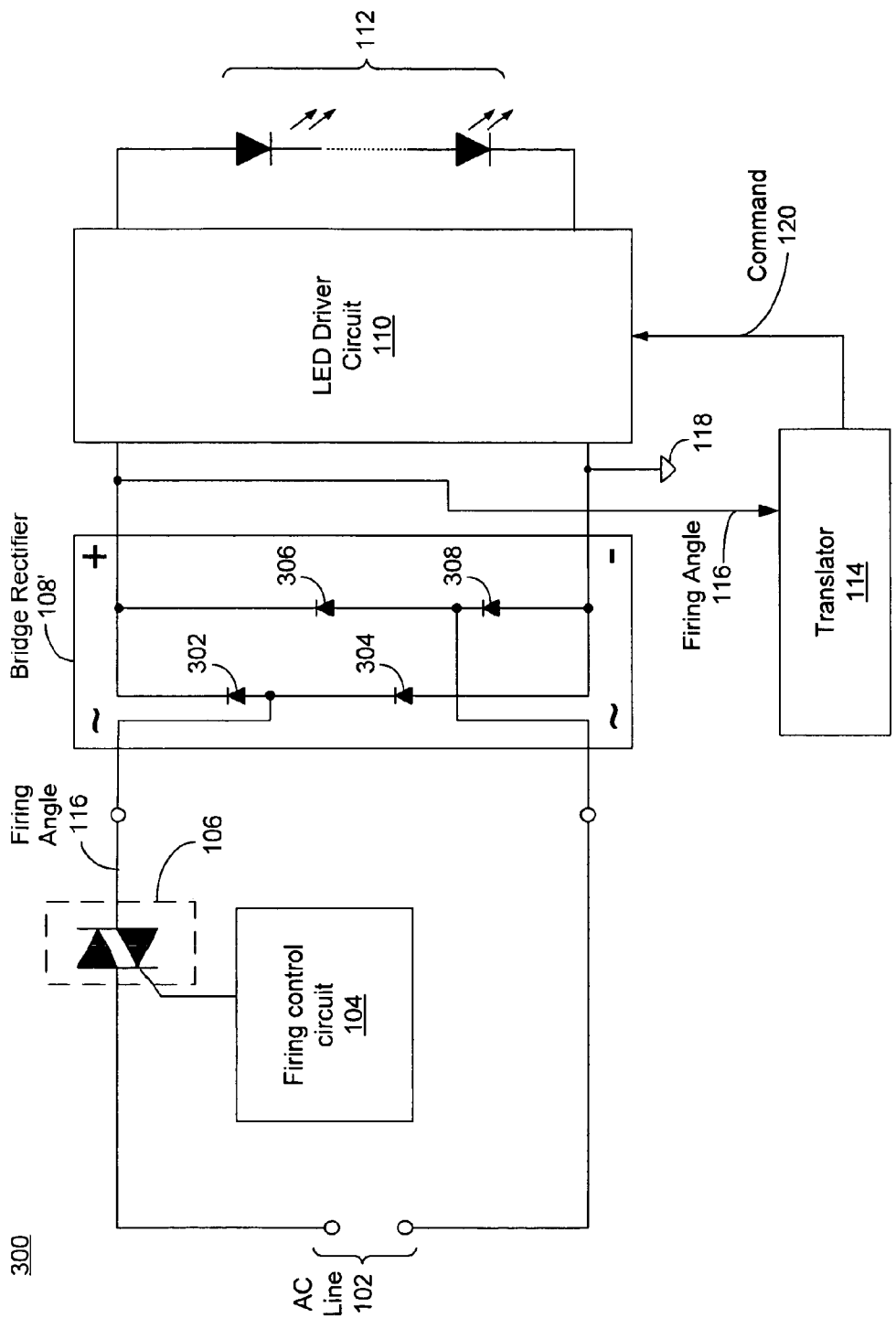
FIG. 3 is a schematic diagram of another exemplary LED control circuit in accordance with various embodiments of the invention.

FIG. 3 is a schematic diagram of an exemplary LED control circuit 300 in accordance with various embodiments of the invention. It is pointed out that the elements of FIG. 3 having the same reference numbers as the elements of any other figure herein can operate or function in any manner similar to that described herein, but are not limited to such. Note that the LED control circuit 300 can include, but is not limited to, power line 102, firing control circuit 104, power switch 106, a bridge rectifier circuit 108', LED driver circuit 110, LED lighting fixture 112, and translator circuit 114.

It is pointed out that the bridge rectifier circuit 108' of the LED control circuit 300 can be implemented in a wide variety of ways. For example in one embodiment, the bridge rectifier circuit 108' can be implemented to include diodes 302, 304, 306, and 308, but is not limited to such. Specifically, diodes 302 and 304 are coupled in series while diodes 306 and 308 are coupled in series. In an embodiment, diodes 302, 304, 306, and 308 can each be implemented as a high-voltage silicon diode.

Within FIG. 3, the light emitting diode (LED) control circuit 300 can include, but is not limited to, an AC power source 102, a power switch 106, a firing control circuit 104, a bridge rectifier 108', a LED driver circuit 110, LED fixture 112, and a translator circuit 114. The power line 102 (e.g., live or high end) can be coupled to an input terminal of the power switch 106. The firing control circuit 104 can be coupled to a control terminal of the power switch 106. An output terminal of the power switch 106 can be coupled to a first terminal of the bridge rectifier 108'. Note that the first terminal of the bridge rectifier 108' can be coupled to an anode of a diode 302 and a cathode of a diode 304. A second terminal (e.g., positive terminal) of the bridge rectifier 108' can be coupled to a first terminal of the LED driver circuit 110 and to an input terminal of the translator circuit 114. It is pointed out that the second terminal of the bridge rectifier 108' can be coupled to a cathode of the diode 302 and a cathode of a diode 306. Additionally, a third terminal (e.g., negative terminal) of the bridge rectifier 108' can be coupled to ground 118 and to a second terminal of the LED driver circuit 110. It is noted that the third terminal of the bridge rectifier 108' can be coupled to an anode of a diode 308 and an anode of the diode 304. An output terminal of the LED driver circuit 110 can be coupled to an anode (or input) of the LED fixture 112. Furthermore, a cathode (or output) of the LED fixture 112 can be coupled to a third terminal of the LED driver circuit 110. An output terminal of the translator circuit 114 can be coupled to a fourth terminal of the LED driver circuit 110. It is noted that a fourth terminal of the bridge rectifier circuit 108' can be coupled to the power line 102 (e.g., neutral or ground). Note that the fourth terminal of the bridge rectifier 108' can be coupled to an anode of the diode 306 and a cathode of the diode 308.

It is noted that the LED control circuit 300 may not include all of the elements illustrated by FIG. 3. Additionally, the LED control circuit 300 can be implemented to include one or more elements not illustrated by FIG. 3. It is pointed out that the LED control circuit 300 can be utilized in any manner similar to that described herein, but is not limited to such.

Figure 4:
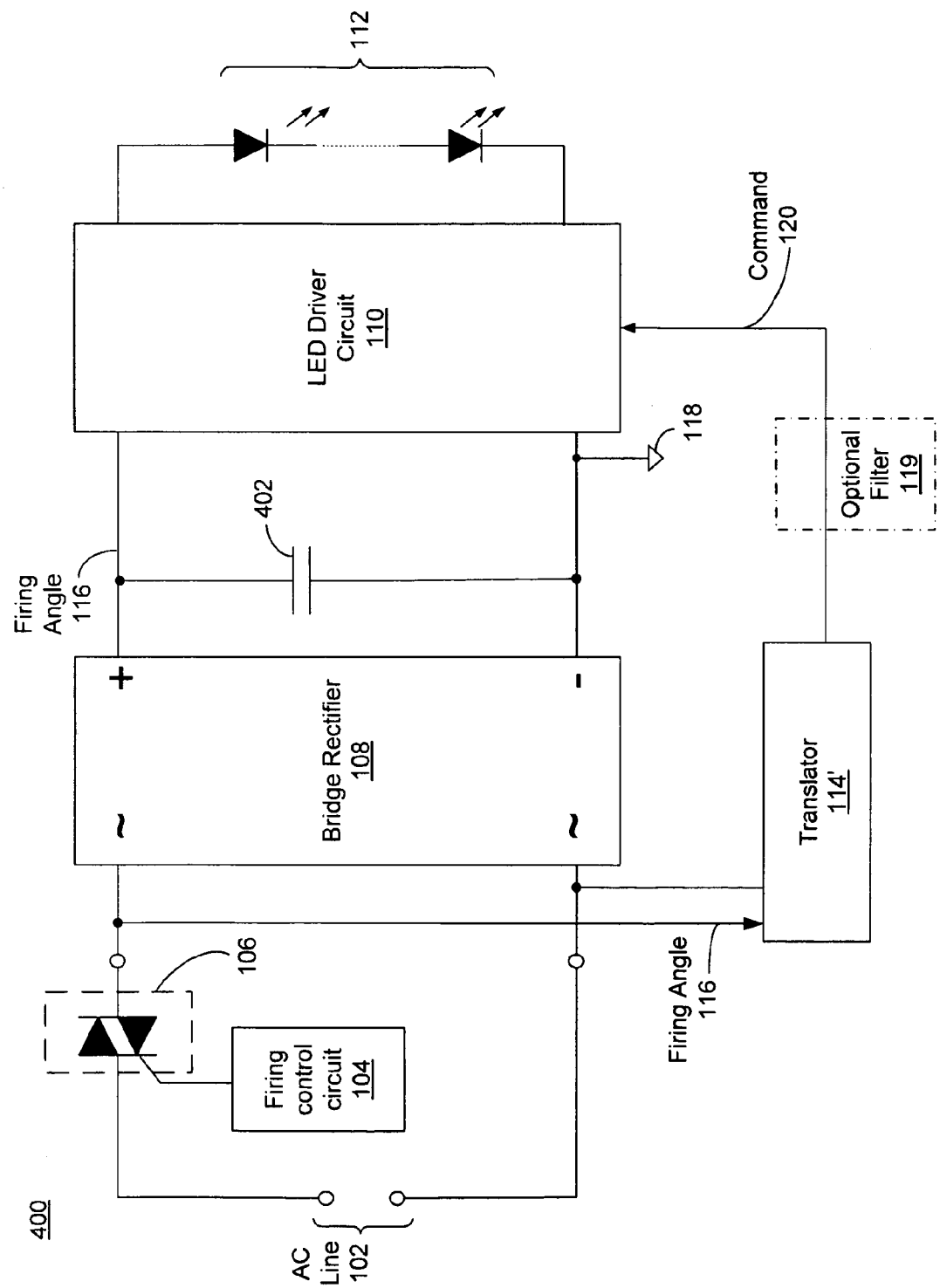
FIG. 4 is a schematic diagram of yet another exemplary LED control circuit in accordance with various embodiments of the invention.

FIG. 4 is a schematic diagram of an exemplary LED control circuit 400 in accordance with various embodiments of the invention. It is pointed out that the elements of FIG. 4 having the same reference numbers as the elements of any other figure herein can operate or function in any manner similar to that described herein, but are not limited to such. Note that the LED control circuit 400 can include, but is not limited to, power line 102, firing control circuit 104, power switch 106, bridge rectifier circuit 108, LED driver circuit 110, LED lighting fixture 112, translator circuit 114', filter element 402, and an optional filter element 119. It is pointed out that within the present embodiment of the LED control circuit 400, the translator circuit 114' can be coupled to the power line 102 and can be coupled to receive the firing angle 116 from the output of the power switch 106. In one embodiment, the filter element 402 is implemented as a capacitor, but is not limited to such. Note that the filter element 402 can be implemented as part of a LED control circuit (e.g., 100, 300, or 500) in a manner similar to that shown within FIG. 4.

Within FIG. 4, the light emitting diode (LED) control circuit 400 can include, but is not limited to, an AC power source 102, a power switch 106, a firing control circuit 104, a bridge rectifier 108, a LED driver circuit 110, LED fixture 112, a filter element 402, a translator circuit 114', and an optional filter element 119. The power line 102 (e.g., live or high end) can be coupled to an input terminal of the power switch 106. The firing control circuit 104 can be coupled to a control terminal of the power switch 106. An output terminal of the power switch 106 can be coupled to a first terminal of the bridge rectifier 108 and to an input terminal of the translator circuit 114'. A second terminal (e.g., positive terminal) of the bridge rectifier 108 can be coupled to a first terminal of the LED driver circuit 110 and to a first terminal of the filter element 402. Additionally, a third terminal (e.g., negative terminal) of the bridge rectifier 108 can be coupled to ground 118, a second terminal of the filter element 402, and to a second terminal of the LED driver circuit 110. An output terminal of the LED driver circuit 110 can be coupled to an anode (or input) of the LED fixture 112. Furthermore, a cathode (or output) of the LED fixture 112 can be coupled to a third terminal of the LED driver circuit 110. An output terminal of the translator circuit 114' can be coupled to a fourth terminal of the LED driver circuit 110. It is noted that a fourth terminal of the bridge rectifier circuit 108 can be coupled to the power line 102 (e.g., neutral or ground) and a first terminal of the translator 114'. In an embodiment, the output terminal of the translator circuit 114' can be coupled to an input terminal of the optional filter element 119, while the output terminal of the filter element 119 can be coupled to the fourth terminal of the LED driver circuit 110.

It is noted that the LED control circuit 400 may not include all of the elements illustrated by FIG. 4. Additionally, the LED control circuit 400 can be implemented to include one or more elements not illustrated by FIG. 4. It is pointed out that the LED control circuit 400 can be utilized in any manner similar to that described herein, but is not limited to such.

Figure 5:
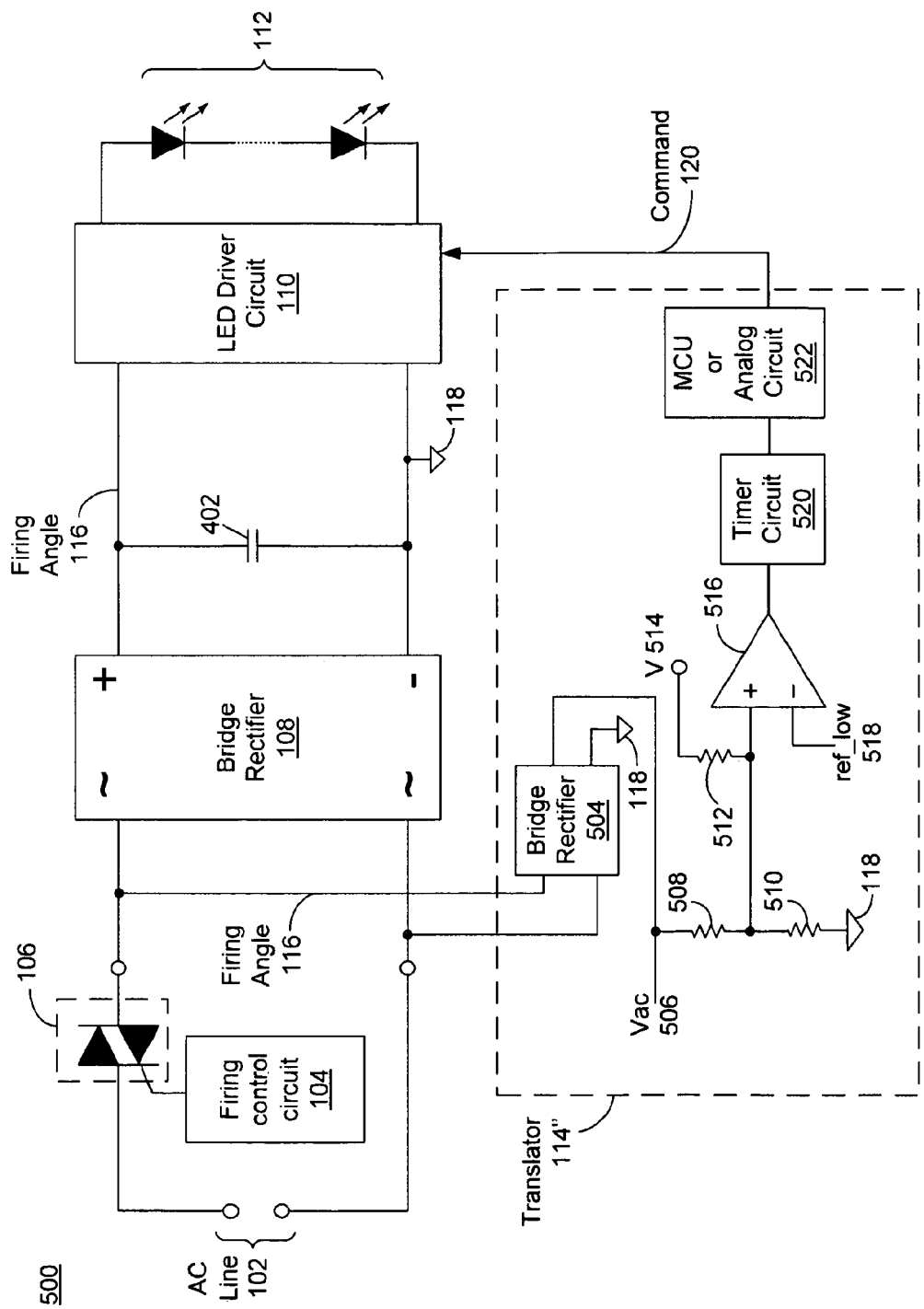
FIG. 5 is a schematic diagram of still another exemplary LED control circuit in accordance with various embodiments of the invention.

FIG. 5 is a schematic diagram of an exemplary LED control circuit 500 in accordance with various embodiments of the invention. It is pointed out that the elements of FIG. 5 having the same reference numbers as the elements of any other figure herein can operate or function in any manner similar to that described herein, but are not limited to such. Note that the LED control circuit 500 can include, but is not limited to, power line 102, firing control circuit 104, power switch 106, bridge rectifier circuit 108, LED driver circuit 110, LED lighting fixture 112, translator circuit 114", and filter element 402.

It is pointed out that the translator circuit 114" can be implemented in a wide variety of ways. For example in one embodiment, the translator circuit 114" can include, but is not limited to, a bridge rectifier circuit 504, resistors 508, 510, and 512, a comparator circuit 516, a timer circuit 520, and a microcontroller unit (MCU) or analog circuit 522. Specifically, the bridge rectifier circuit 504 of the translator circuit 114" can be coupled to receive the firing angle 116 from the output of the power switch 106 and is also coupled to the power line 102. The output of the bridge rectifier 504 can be coupled to a resistor divider that includes resistors 508 and 510, which is coupled to ground 118. Note that an alternating current voltage (Vac) 506 is located at the output of the bridge rectifier 504. It is pointed out that the resistor 512 and the voltage 514 provide a bias to the translator circuit 114". The voltage 514 can be generated by the LED control circuit 500. The bias voltage can be received by one of the inputs of the comparator circuit 516 while the other input of the comparator 516 can be coupled to receive a low reference voltage threshold (reflow) 518. The output of the comparator 516 can be coupled to a timer circuit 520. It is noted that the comparator circuit 516 can be referred to as a window comparator.

Within FIG. 5, the timer circuit 520 can time the width of the pulses that are output by the comparator circuit 516, which results in measuring the firing angle 116. The timer circuit 520 can output an analog voltage, a digital signal, or a mixed bit stream, but is not limited to such, which can be received by the MCU or analog circuit 522. It is noted that depending on what the timer circuit 520 outputs (e.g., analog or digital or mixed), the block 522 can be implemented accordingly. For example in one embodiment, if the timer circuit 520 outputs a digital signal, block 522 can be implemented as a microcontroller or discrete digital circuit. However, if the timer circuit 520 outputs an analog voltage, block 522 can be implemented as an analog circuit. In one embodiment, the microcontroller or analog circuit 522 can create a proportionality between the firing angle 116 and a functionality (e.g., brightness) of the LED lighting fixture 112. Specifically, a microcontroller or analog circuit 522 can translate the firing angle 116 into a function associated with the LED lighting fixture 112. It will be appreciated that relationships other than proportionality can also be created by the translator 114", by reprogramming of the microcontroller or analog circuit 522. In one embodiment, the microcontroller or analog circuit 522 can output the command signal 120 to the LED driver circuit 110 that is associated with the function of the LED lighting fixture 112. Note that the translator 114" can be implemented as part of a LED control circuit (e.g., 100, 300, or 400) in a manner similar to that shown within FIG. 5, but is not limited to such.

Within FIG. 5, the light emitting diode (LED) control circuit 500 can include, but is not limited to, an AC power source 102, a power switch 106, a firing control circuit 104, a bridge rectifier 108', a LED driver circuit 110, LED fixture 112, and a translator circuit 114". The power line 102 (e.g., live or high end) can be coupled to an input terminal of the power switch 106. The firing control circuit 104 can be coupled to a control terminal of the power switch 106. An output terminal of the power switch 106 can be coupled to a first terminal of the bridge rectifier 108 and an input terminal of the translator 114". A second terminal (e.g., positive terminal) of the bridge rectifier 108 can be coupled to a first terminal of the LED driver circuit 110 and to a first terminal of the filter element 402. Additionally, a third terminal (e.g., negative terminal) of the bridge rectifier 108 can be coupled to ground 118, a second terminal of the filter element 402, and to a second terminal of the LED driver circuit 110. An output terminal of the LED driver circuit 110 can be coupled to an anode (or input) of the LED fixture 112. Furthermore, a cathode (or output) of the LED fixture 112 can be coupled to a third terminal of the LED driver circuit 110. An output terminal of the translator circuit 114" can be coupled to a fourth terminal of the LED driver circuit 110. It is noted that a fourth terminal of the bridge rectifier circuit 108 can be coupled to the power line 102 (e.g., neutral or ground) and a first terminal of the translator 114".

It is noted that the LED control circuit 500 may not include all of the elements illustrated by FIG. 5. Additionally, the LED control circuit 500 can be implemented to include one or more elements not illustrated by FIG. 5. It is pointed out that the LED control circuit 500 can be utilized in any manner similar to that described herein, but is not limited to such.

Figure 6:
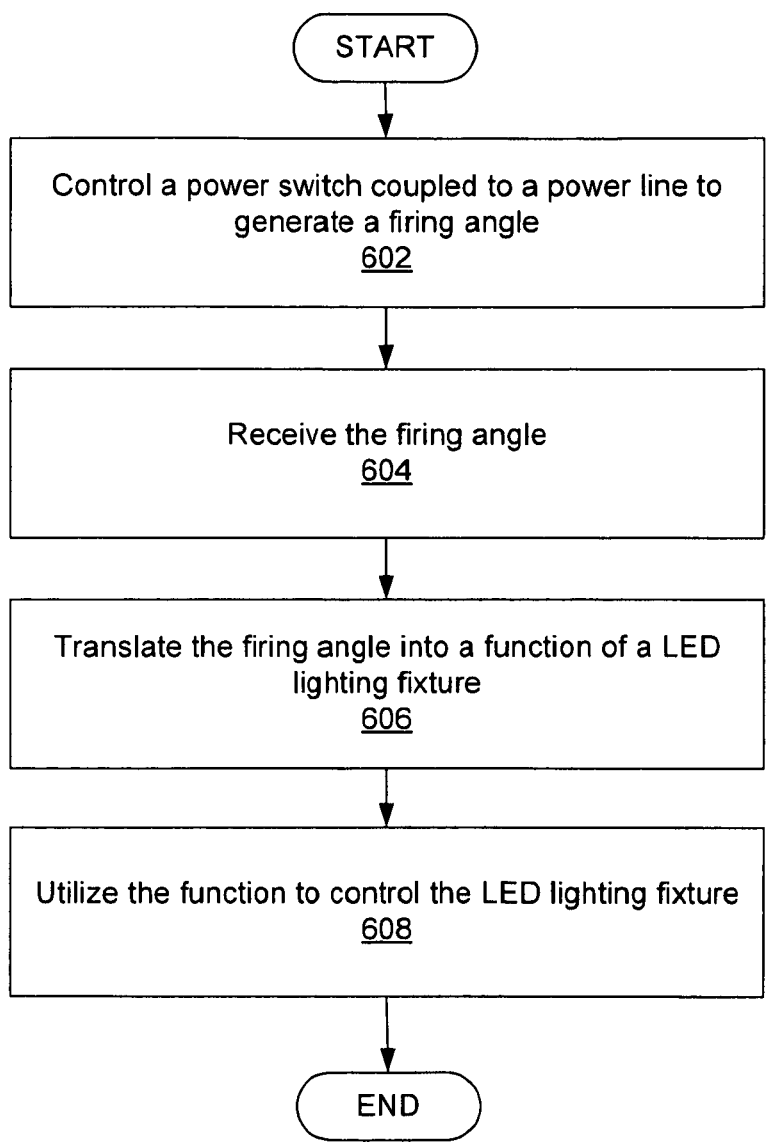
FIG. 6 a flow diagram of an exemplary method in accordance with various embodiments of the invention.

FIG. 6 is a flowchart of a method 600 for controlling a light emitting diode (LED) lighting fixture via a power line in accordance with various embodiments of the invention. Method 600 includes exemplary processes of embodiments of the invention which can be carried out by electrical circuitry. Although specific operations are disclosed in method 600, such operations are exemplary. That is, method 600 may not include all of the operations illustrated by FIG. 6. Also, method 600 may include various other operations and/or variations of the operations shown by FIG. 6. Likewise, the sequence of the operations of method 600 can be modified. It is noted that the operations of method 600 can each be performed by software, by firmware, by electronic hardware, by electrical hardware, or by any combination thereof.

Specifically, method 600 can include controlling a power switch coupled to a power line in order to generate a firing angle. Additionally, the firing angle can be received from the power switch. The firing angle can be translated into a function of a LED lighting fixture. The function can be utilized to control the LED lighting fixture.

At operation 602 of FIG. 6, a power switch (e.g., 106) coupled to a power line (e.g., 102) can be controlled in order to generate a firing angle (e.g., 116). It is pointed out that the operation 602 can be implemented in a wide variety of ways. For example, operation 602 can be implemented in any manner similar to that described herein, but is not limited to such.

At operation 604, the firing angle can be received from the power switch. It is noted that operation 604 can be implemented in a wide variety of ways. For example, operation 604 can be implemented in any manner similar to that described herein, but is not limited to such.

At operation 606 of FIG. 6, the firing angle can be translated into one or more functions or properties of a LED lighting fixture (e.g., 112). Note that the operation 606 can be implemented in a wide variety of ways. For example, the one or more functions or properties can include, but is not limited to, an intensity command for the LED lighting fixture, a color command for the LED lighting fixture, a power factor command for the LED lighting fixture, and/or a power dissipation command for the LED lighting fixture. Operation 606 can be implemented in any manner similar to that described herein, but is not limited to such.

At operation 608, the one or more functions or properties can be utilized to control the LED lighting fixture. It is pointed out that operation 608 can be implemented in a wide variety of ways. For example, operation 608 can be implemented in any manner similar to that described herein, but is not limited to such. At the completion of operation 608, process 600 can be exited or ended.

The foregoing descriptions of various specific embodiments in accordance with the invention have been presented for purposes of illustration and description. They are not intended to be exhaustive or to limit the invention to the precise forms disclosed, and many modifications and variations are possible in light of the above teaching. The invention is to be construed according to the Claims and their equivalents.

What is claimed is:

1. A light emitting diode (LED) circuit, comprising:
a control circuit configured to control a power switch such that the power switch outputs a firing angle such that the firing angle is encoded with a plurality of functions, wherein a first pulse of the firing angle is encoded with a first of the plurality of functions and a second pulse of the firing angle is encoded with a second of the plurality of functions;
a translator circuit configured to receive the firing angle output by the power switch and map the firing angle to a plurality of commands;
a LED lighting fixture coupled to the translator circuit and configurable to provide the plurality of functions controllable based on the plurality of commands.

2. The LED circuit of claim 1, further comprising a LED driver circuit coupled to the LED lighting fixture.

3. The LED circuit of claim 1, wherein the LED lighting fixture comprises a plurality of LEDs coupled in one of series and parallel.

4. The LED circuit of claim 1, wherein the plurality of functions comprises an intensity function for the LED lighting fixture and a color function for the LED lighting fixture.

5. A method for controlling a light emitting diode (LED) lamp, the method comprising:
receiving a firing angle encoded with a plurality of functions, wherein a first pulse of the firing angle is encoded with a first of the plurality of functions and a second pulse of the firing angle is encoded with a second of the plurality of functions;
translating the firing angle into a plurality of commands of the LED lamp; and
utilizing the one of the plurality of commands to control the LED lamp, wherein the LED lamp is configurable to provide the plurality of functions controllable based on the plurality of commands.

6. The method of claim 5, wherein the plurality functions comprises an intensity function for the LED lamp.

7. The method of claim 6, wherein the plurality of functions comprises a color function for the LED lamp.

8. The method of claim 5, wherein the LED lamp comprises a plurality of LEDs coupled in one of series and parallel.

9. A light emitting diode (LED) circuit, comprising:
a control circuit configured to control a power switch such that the power switch outputs a firing angle encoded with a plurality of functions, wherein a first pulse of the firing angle is encoded with a first of the plurality of functions and a second pulse of the firing angle is encoded with a second of the plurality of functions;
a translator circuit configured to receive the firing angle output by the power switch and map the firing angle to a plurality of commands; and
a LED lighting fixture coupled to the translator circuit and configurable to provide the plurality of functions controllable based on the plurality of commands.

10. The LED circuit of claim 9, wherein the translator circuit comprises a circuit to derive the plurality of commands.

11. The LED circuit of claim 9, wherein the plurality of commands comprises a dimming command for the LED lighting device.

12. The LED circuit of claim 11, wherein the plurality of commands further comprises a color command for the LED lighting device.

13. The LED circuit of claim 12, wherein the plurality of commands further comprises a power factor command for the LED lighting device.

14. The LED circuit of claim 13, wherein the plurality of commands further comprises a power dissipation command for the LED lighting device.

15. The LED circuit of claim 9, wherein the power switch is coupled to a power line and configured to output the firing angle.

16. The LED circuit of claim 15, wherein the power switch comprises a triac.

* * * * *